US005468198A

United States Patent [19]
Holbrook et al.

[11] Patent Number: 5,468,198
[45] Date of Patent: Nov. 21, 1995

[54] METHOD OF CONTROLLING COASTDOWN AND COASTDOWN/TIP-IN IN AN AUTOMATIC TRANSMISSION

[75] Inventors: Gerald L. Holbrook, Rochester Hills; Maurice B. Leising, Clawson; David L. Kwapis, Troy, all of Mich.

[73] Assignee: Chrysler Corporation, Highland Park, Mich.

[21] Appl. No.: 206,521

[22] Filed: Mar. 4, 1994

[51] Int. Cl.$^6$ .................................................. F16H 61/06
[52] U.S. Cl. ............................ 477/143; 477/64; 477/144; 477/149; 477/156
[58] Field of Search .............................. 477/61, 64, 143, 477/144, 148, 149, 150

[56] References Cited

U.S. PATENT DOCUMENTS

| | | |
|---|---|---|
| 3,881,368 | 5/1975 | Furuhashi et al. . |
| 3,942,393 | 3/1976 | Forster et al. . |
| 4,044,634 | 8/1977 | Florus et al. . |
| 4,073,204 | 2/1978 | Dick . |
| 4,131,036 | 12/1978 | Ivey et al. . |
| 4,208,925 | 6/1980 | Miller et al. . |
| 4,220,058 | 9/1980 | Petzold . |
| 4,258,591 | 3/1981 | Eckert et al. . |
| 4,290,322 | 9/1981 | Huitema . |
| 4,485,443 | 11/1984 | Knodler et al. . |
| 4,503,734 | 3/1985 | Acker . |
| 4,535,412 | 8/1985 | Cederquist . |
| 4,541,308 | 9/1985 | Person et al. . |
| 4,560,047 | 12/1985 | McCarthy et al. . |
| 4,637,281 | 1/1987 | Vanselous . |
| 4,707,789 | 11/1987 | Downs et al. . |
| 4,724,723 | 2/1988 | Lockhart et al. . |
| 4,730,519 | 3/1988 | Nakamura et al. . |
| 4,791,568 | 12/1988 | Hiramatsu et al. . |
| 4,875,391 | 10/1989 | Leising et al. . |
| 4,905,545 | 3/1990 | Leising et al. . |
| 4,951,200 | 8/1990 | Leising et al. . |
| 5,035,160 | 7/1991 | Morita ................................ 477/143 X |
| 5,038,286 | 8/1991 | Asayama et al. ................... 477/143 X |
| 5,292,288 | 3/1994 | Kashiwabara et al. ............... 477/61 X |

*Primary Examiner*—Rodney H. Bonck
*Assistant Examiner*—Peter Kwon
*Attorney, Agent, or Firm*—Mark P. Calcaterra

[57] ABSTRACT

An electronic transmission coastdown shift control method in which the transmission controller has the capacity to predict timing of apply element application. The control method of the present invention improves the shift sequence by accurately prefilling the apply element. The transmission controller vents the release element when apply element application is imminent and controls the application of the oncoming element to achieve a controlled element exchange for a smooth coastdown shift. A duty cycle is then applied to complete the oncoming element application with a soft yet quick application and control the engagement of the oncoming element. The identification of the application point of the oncoming element enables the apply element fill volume to be learned during coastdown shifts. It also enables the calculation of a line pressure correction factor necessary in accurately predicting application of the apply element. Anticipation of a coastdown tip-in condition is also provided. When a tip-in condition is sensed, a more aggressive fast fill of the apply element is undertaken in order to handle an approaching input torque increase.

26 Claims, 3 Drawing Sheets

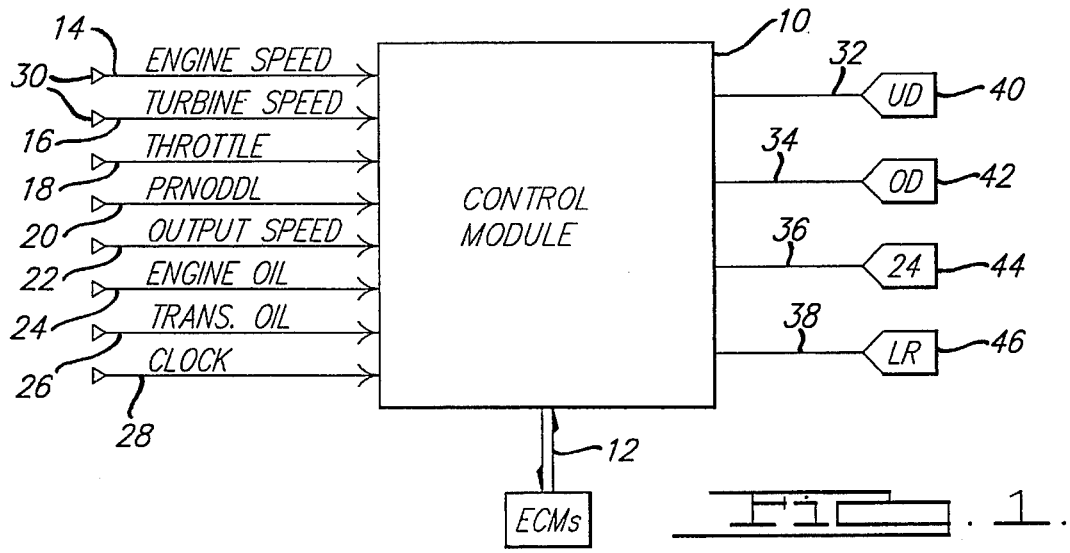
FIG. 1.
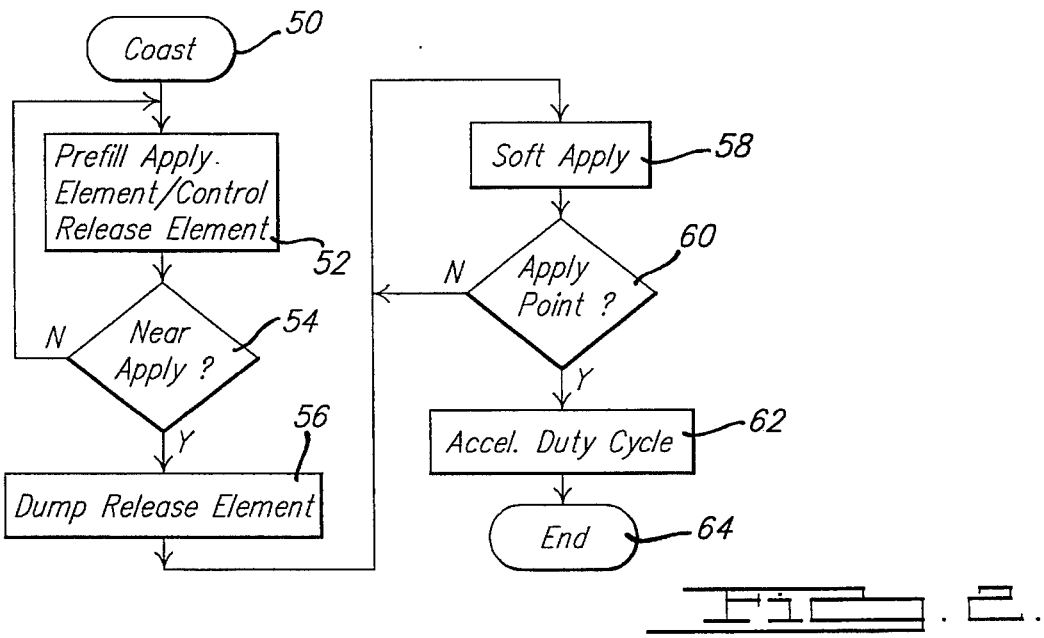
FIG. 2.
| | INITIAL VALUES | | | | | |
|---|---|---|---|---|---|---|
| Point | $M_{21}$ | | $M_{32}$ | | $M_{43}$ | |
| | $T_o$ | M | $T_o$ | M | $T_o$ | M |
| A | 80° | 1.00 | 80° | 1.00 | 110° | 0.80 |
| B | 130° | 0.95 | 140° | 0.92 | 150° | 0.76 |
| C | 180° | 0.92 | 210° | 0.86 | 210° | 0.68 |
| D | 235° | 0.82 | 450° | 0.45 | 450° | 0.45 |
| E | 450° | 0.45 | | | | |
FIG. 4.

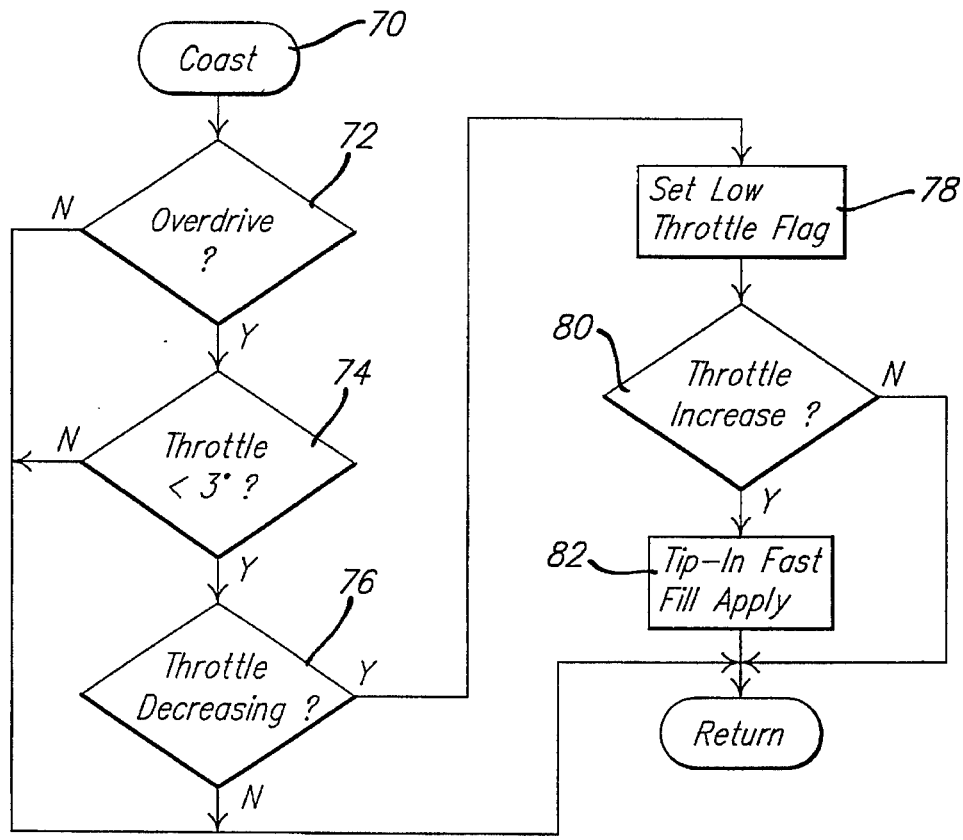
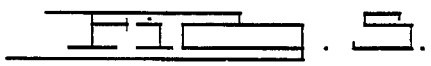
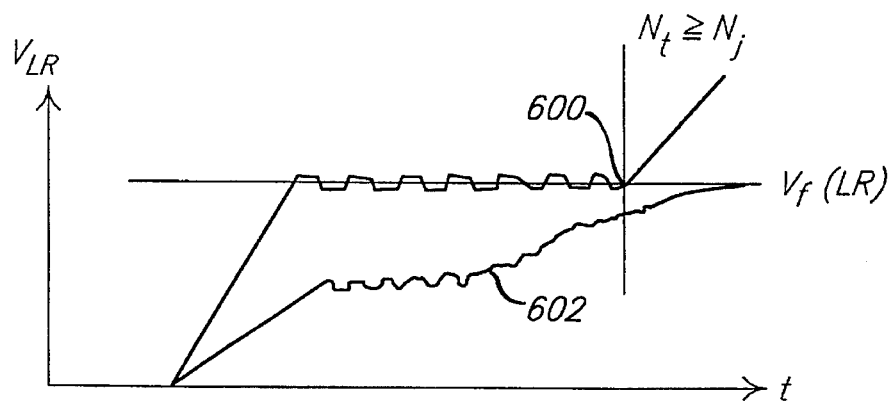
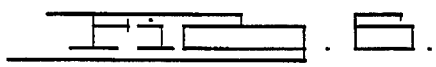

METHOD OF CONTROLLING COASTDOWN AND COASTDOWN/TIP-IN IN AN AUTOMATIC TRANSMISSION

BACKGROUND OF THE INVENTION

1. Field of the Invention

The present invention relates generally to an electronically controlled automatic transmission and, more particularly, to an improved automatic transmission coastdown and coastdown/tip-in control sequence method.

2. Discussion

Automotive vehicles generally incorporate a motive force system having three basic components: an engine, a power train and wheels. The engine produces force by converting chemical energy from a liquid fuel into the mechanical energy of motion. The power train transmits the resultant force of this kinetic energy to the wheels which frictionally contact a surface for moving the vehicle. The main component of the power train is the transmission, which transmits engine torque over a relatively limited angular speed range to the wheels over a broader speed range, in accordance with the tractive-power demand of the vehicle. The transmission also controls the direction of rotation applied to the wheels so that the vehicle may be driven both forward and backward.

One advanced type of transmission is a four speed electronically controlled automatic transmission with overdrive. Examples of this type of electronically controlled automatic transmission are described in U.S. Pat. No. 4,875,391, entitled "An Electronically-Controlled, Adaptive Automatic Transmission System", issued on Oct. 24, 1989 to Leising et al.; U.S. Pat. No. 4,905,545, entitled "Method Of Controlling The Speed Change Of A Kickdown Shift For An Electronic Transmission System", issued on Mar. 6, 1990 to Leising, et al. and U.S. Pat. No. 4,951,200, entitled =37 Method Of Controlling The Apply Element During A Kickdown Shift For An Electronic Automatic Transmission System", issued on Aug. 21, 1990 to Leising, et al. These patents are owned by the Assignee of the present application and are incorporated herein by reference. However, it should be appreciated that the principles of the present invention are not limited to any particular electronically controlled automatic transmission, and that the present invention may be applied to a wide variety of other powertrain configurations.

The transmission in the patents incorporated herein by reference includes four friction elements or clutches which are applied or engaged in various combinations in relation to each of the vehicle's gears. Those elements in the present transmission include an underdrive clutch (applied in first, second and third gears), an overdrive clutch (applied in third and fourth gears), a two/four shift clutch (applied in second and fourth gears) and a low/reverse clutch (applied in first and reverse gears).

To apply each of these clutches, an electronically controlled hydraulic fluid actuating device such as a solenoid-actuated valve is used. There is typically one valve for each clutch: an underdrive clutch solenoid-actuated valve, an overdrive clutch solenoid-actuated valve, a two/four shift solenoid-actuated valve and a low/reverse solenoid-actuated valve. Each valve controls fluid flow to a respective clutch apply cavity. The flow of fluid into a clutch apply cavity causes a piston to move axially, which results in the application or engagement of that clutch. Fluid flow is enabled by the opening of the solenoid-actuated valve in response to command or control signals received by the solenoid from an electronic control system.

The electronic control system includes a microcomputer-based transmission control module capable of receiving and monitoring input signals indicative of various vehicle operating conditions such as engine speed, torque converter turbine speed, output speed (vehicle speed), throttle angle position, brake application, predetermined hydraulic pressures, a driver selected gear or operating condition (PRN-ODDL), engine coolant temperature and/or the ambient air temperature. Based on the information contained in these signals, the controller generates command or control signals for causing the actuation of each of the solenoid-actuated valves which regulate the application and release of fluid pressure to and from the apply cavities of the clutches or frictional elements of the transmission. Accordingly, the controller is programmed to execute predetermined shift schedules stored in a memory of the controller through appropriate command signals to the solenoid-actuated valves.

Of these shift schedules, transmission downshifts (from a higher gear into a lower gear) in this type of system, other than driver-actuated manual downshifts in which the driver physically changes the position of the vehicle shift lever, can be generally classified into two basic types: a power-on kickdown shift, made in response to a sharp increase in throttle to add torque, and a coastdown shift, which occurs as the vehicle is being slowed to a stop. Conventional coastdown shift control in these transmissions has in the past been essentially kickdown control that was adjusted where possible for the low speed and torque conditions of coastdown shifts. The control strategy was primarily based on control of the release element, (i.e., the clutch to be vented or released in performing the gear change). In this type of control, the release element remained engaged throughout the downshift. The turbine speed was allowed to rise to slightly above a target gear turbine speed and was controlled at that level until the apply element engaged. Only after the apply element was engaged would the release element be completely vented or "dumped".

This type of control strategy protects the transmission against the throttle re-opening at any time, since the release element remains engaged until the apply element has been engaged. However, this strategy can result in enough simultaneous over-capacity of the applying and releasing elements to cause a fight that results in a condition sometimes referred to as "coastdown bump". This has been up to now almost unavoidable because the exact timing of the oncoming element's application was unpredictable since this timing may vary with transmission oil temperature, pump and valve clearances, engine idle speed and other such variables.

SUMMARY OF THE INVENTION

The novel transmission control method of the present invention has the capacity to learn and compensate for most of the above variables so that the timing of element application can be predicted. With this improved accuracy, the transmission controller will dump or vent the release element when apply element application is imminent and control the application of the oncoming element to achieve a controlled element exchange for a smooth coastdown shift.

The control method of the present invention improves the shift sequence by prefilling the apply element to a near apply point before any release element slip occurs. If this is not possible, as in a 3-2-1 skip shift where slip may already exist at the beginning of the shift, then the control system selectively controls the release element in order to slow down the turbine speed change so that the apply element will be just ready to apply just after the actual turbine speed reaches that of the target gear (the gear to be shifted into). This slowed speed change also maintains some release element capacity in order to protect against a sudden unexpected throttle re-opening.

Target volume logic is used for release element control during the speed change and until the turbine speed achieves the turbine speed of the target gear. There is no longer an attempt to use the release element to control turbine speed slightly above the target gear speed. Rather, the release element is vented once target gear speed is achieved.

Prior to achieving target gear turbine speed, the apply element prefill is controlled such that its application will occur at a predetermined time after starting a soft apply duty cycle. Further, the prefill and release element control are such that the start of the soft apply duty cycle is synchronized with turbine speed achieving target gear speed. The soft apply duty cycle is used to complete the oncoming element application with a soft application. When turbine acceleration approaches the desired value, a feedback control duty cycle is then used to complete and control full engagement of the oncoming element.

A pull in turbine speed down from engine speed, caused by the application of the apply element, is used to identify the application point of the oncoming element. This information enables apply element fill volume to now be learned during coastdown shifts. It also enables more accurate calculation of a line pressure correction factor necessary in accurately predicting application of the apply element and in providing quality coastdown shifts. Also, fluid apply-rate data is now learned as a function of the transmission operating temperature to better accommodate the varying operating conditions which occur when the transmission oil temperature increases.

Anticipation by the transmission controller of a coastdown tip-in condition is also provided. This condition generally occurs during a coastdown shift when a slight increase in throttle angle indicates a possible acceleration, and therefore an accompanying soon to follow increase in input torque. When a tip-in condition is sensed, a more aggressive fast fill of the apply element is undertaken in order to handle the approaching input torque increase.

Additional advantages and features of the present invention will become apparent from the subsequent description and the appended claims, taken in conjunction with the accompanying drawings.

BRIEF DESCRIPTION OF THE DRAWINGS

FIG. 1 is a schematic diagram of the transmission controller of the present invention.

FIG. 2 is a flow chart illustrating the coastdown control sequence of the present invention.

FIG. 4 is a graph and corresponding table used in the calculation of a line pressure correction factor.

FIG. 5 is a flow chart illustrating the coastdown control sequence for a tip-in.

FIG. 6 is a graphical illustration of element fill volume control during tip-in versus a normal coastdown shift.

DETAILED DESCRIPTION OF A PREFERRED EMBODIMENT

Figure 3:
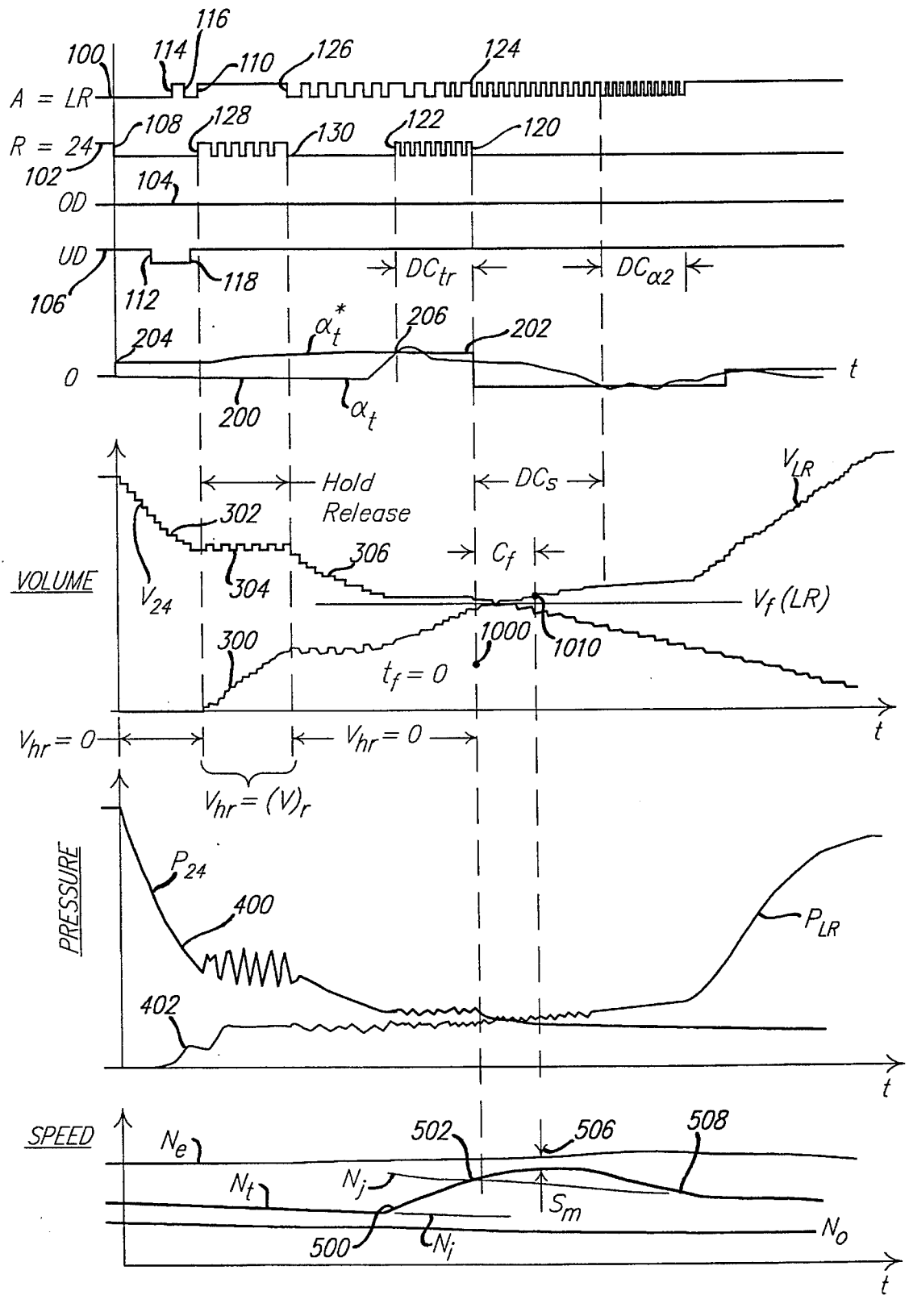
FIG. 3 is a graphical illustration of the control sequence of the flow chart in FIG. 2.

The following description of the presently preferred embodiment is merely exemplary in nature and is in no way intended to limit the invention or its application or uses.

An automatic transmission having a method of control as detailed in the aforementioned patents incorporated herein by reference, and according to the present invention, is adapted to be used in a vehicle such as an automobile. However, it should be appreciated that the principles of the present invention may be employed in other types of vehicles and devices. Such a transmission typically includes a transmission housing or case for enclosing the numerous subassemblies which make up the transmission, including a torque converter assembly, pump assembly, multi-clutch assembly and gear assembly.

The transmission also includes a micro-processor based transmission control module 10, as shown in FIG. 1, having input and output capabilities, processor means and non-volatile ROM as well as RAM based memory. Module 10 is electronically coupled via bus 12 to other vehicle electronic control modules (ECMs). Module 10 receives as inputs a number of electrical signals including a signal indicative of engine speed 14, torque converter turbine speed 16, throttle angle 18, shift lever position (PRNODDL) 20, output speed 22, engine oil temperature 24, transmission oil temperature 26 and a timing clock 28. These signals are provided by appropriate sensors 30 operatively coupled to various vehicle components, as generally known in the art.

The control module 10 is preferably adapted to continuously monitor these signals and uses the information contained therein to continuously calculate and update various parameters necessary to carry out its function. Such parameters include the instantaneous fluid volume displaced by an element as well as the volume of fluid necessary to cause application of that element. Because these values may vary somewhat depending upon the operating conditions of the vehicle and its transmission (i.e. oil temperature, engine speed), control module 10 continuously tracks and updates or "learns" this information as the transmission operates. The present transmission control is therefore adaptive in that it is able to adapt its control strategy to provide consistent shift quality in various types of vehicles even during changes in these types of vehicle conditions.

In performing its functions, the processor of control module 10 operates on a cyclical basis, running process loops in time increments of δt. During each loop, module 10 adapts to changing conditions by updating the various parameters used in its control strategy. In the presently preferred embodiment, δt is 7 msec., but could alternately vary.

The transmission control module 10 has among its outputs, means for applying an energizing signal to each of four solenoid-actuated valves via buses 32, 34, 36 and 38. An energizing signal, or the absence of an energizing signal, on these buses causes the application or release of the associated frictional elements of the system by the underdrive (UD) clutch solenoid-actuated valve 40, overdrive (OD) clutch valve 42, two/four shift (24) clutch valve 44 and low/reverse (LR) clutch valve 46.

Each clutch and corresponding clutch valve has a logical "ON" (applied) and a logical "OFF" (released) position. In the transmission of the presently preferred embodiment both the underdrive clutch and two/four shift clutch are designed to be normally applied. This means that in the absence of electrical power, the underdrive solenoid-actuated valve 40 and the two/four shift actuated valve 44 will allow pressure or fluid flow to the underdrive clutch apply cavity and two/four shift clutch apply cavity. The low/reverse and overdrive clutches, on the other hand, are designed to be normally vented. In the absence of electrical power, the overdrive and low-reverse valves will vent, preventing fluid flow into the overdrive and low/reverse clutch cavities. Although the coastdown control sequence of the present invention will be described using these normally applied or vented positions, the control sequence concept disclosed herein could also be applied to transmissions having clutches of different normal positions or to those having a different configuration of friction elements, a different number of gears or one or more free wheeling clutches.

Referring now to FIG. 2, the coastdown control sequence of the present invention, as performed by the control system of FIG. 1, begins at bubble 50 wherein a possible coastdown condition is recognized by the transmission control module 10. This condition generally occurs as the vehicle is being slowed to a stop, as may be indicated to transmission control module 10 by a decrease in throttle angle as communicated through signal 18, and through decreased output speed via signal 22. This coastdown situation is thereby separated from a kickdown shift situation wherein throttle angle is increasing sharply and a downshift is initiated mainly to build additional torque.

The transmission controller of the present invention provides coastdown shift control, preferably selected from the following possible downshifts: 4-3 (fourth gear to third gear), 3-2 (third gear to second gear), 3-1 or 2-1. To perform the shift smoothly, transmission control module 10 controls the pressure on applying and releasing clutches in an orchestrated manner using stored shift schedules. A hand-off takes place between these elements as the release element gradually releases torque as the apply element takes over.

For purposes of example, FIG. 3 illustrates graphically a second to first gear (2-1) coastdown shift and may be referenced in conjunction with the flow chart of FIG. 2 to best illustrate the coastdown control method of the present invention. Although control of coastdown shifts from and to other gears will differ somewhat from that described in conjunction with the 2-1 coastdown shift described herein, the 2-1 shift is most likely more complicated than other shifts and its description best covers the control sequences of the present invention. However, it should be readily apparent that variations, changes and modifications can be made to the invention as described herein without departure from the spirit or scope of this invention.

The top four traces in the graph of FIG. 3 illustrate the logical ON or OFF condition of each of the four friction elements, the low/reverse (LR), two/four shift (24), overdrive (OD) and underdrive (UD). The next pair of traces illustrate desired and actual turbine acceleration, $\alpha_t^*$ and $\alpha_t$, respectively. The following pair of traces illustrate instantaneous tracked volumes of the two/four shift element, $V_{24}$, and the low/reverse element, $V_{LR}$. Traces for corresponding estimated clutch pressures in these elements, $P_{24}$ and $P_{LR}$, follow. The bottom traces in the graph illustrate the relationships between engine speed ($N_e$), turbine speed ($N_t$), desired current gear target turbine speed ($N_i$) and desired target gear turbine speed ($N_j$).

Returning now to FIG. 2, upon recognition of a coastdown condition at bubble 50, control module 10 recognizes the current drive gear and determines the target gear (typically just the next lower gear) in a known manner. Based upon this information, the control module 10 can determine the friction element which must be released ("the release element") and that which must be applied ("the apply element") to accomplish the oncoming downshift. The respective states of the remaining elements is also determined.

For example, in the transmission of the type disclosed in the patents herein incorporated by reference, to accomplish a downshift from second to first gear, as illustrated in the chart below, the LR clutch must be applied or turned ON and the 24 shift clutch must be released or turned OFF.

|     | LR  | 24  | OD  | UD  |
| --- | --- | --- | --- | --- |
| 1st | ON  | OFF | OFF | ON  |
| 2nd | OFF | ON  | OFF | ON  |
| 3rd | OFF | OFF | ON  | ON  |
| 4th | OFF | ON  | ON  | OFF |

However, it should be apparent that the application and release of the friction elements of a particular transmission could vary from that depicted in the chart above, depending upon whether that transmission is a 3-speed, 4-speed, etc. and upon the particular configuration of its friction elements.

As shown in the graph of FIG. 3, prior to the beginning of the 2-1 coastdown shift, the transmission of the present invention is in second gear wherein the apply element (LR clutch) at reference numeral 100 is logically OFF while the release element (24 shift clutch) at 102 is logically ON. The OD clutch is OFF at 104 where it remains throughout the duration of the shift. The UD clutch at 106 is ON and also substantially remains in that state.

Upon determining the elements to be applied and released, the control module 10 begins the coastdown control sequence of the present invention with an initial release of the release element, in this instance the 24 shift clutch at 108. The transmission control module 10 simultaneously controls the apply element, the LR clutch in the coastdown shift to first gear illustrated graphically in FIG. 3. Control of the LR apply element from point 100 to point 110 in the 2-1 shift of FIG. 3 is accomplished using the solenoid switch valve logic, as generally described in the patents herein incorporated by reference. However, depending on transmission configuration this logic may not necessarily be used in other coastdown shifts, in particular those other than shifts to first gear.

In the transmission of the referenced patents, a solenoid switch or reciprocal fluid valve provides hydraulic protection against simultaneous actuation of the low/reverse clutch solenoid-actuated valve 46 and either the two/four shift clutch solenoid-actuated valve 44 or overdrive clutch solenoid-actuated valve 42. The hydraulic protection feature is achieved by designing the valve so that for a downshift to first gear, a specific logic controlled sequence of solenoid commands from the transmission control module 10 is required in order to allow LR clutch application after an upshift from first gear has occurred.

Briefly, in a downshift to first gear, the solenoid switch valve (SSV) logic performed by control module 10 first waits until the two/four clutch pressure falls to less than 60% of the fluid line pressure. It then turns OFF the underdrive (UD) clutch solenoid-actuated valve at 112. The LR clutch solenoid actuated valve is turned ON at 114. The LR clutch valve is then turned OFF at 116, after the logic confirms the valve has moved via an LR pressure switch input. Controller 10 then turns ON the UD clutch at 118 and returns to normal apply element downshift control. The 24 shirt release element generally remains in an OFF state during this SSV logic control.

A prefill of the apply element, initiated at block 52 of the flow chart of FIG. 2, begins at 110. This prefill is designed to minimize the time necessary to engage the apply element at the instant engagement is desired. This provides a more controlled and smoother hand off from the release to the apply element. This prefill is generally begun by logically turning ON the apply element via a signal on the appropriate one of buses 30, 32, 34 or 36 to a corresponding solenoid-actuated valve 38, 40, 42 or 44, while continuously calculating the instantaneous fluid fill volume of that element. In the exemplary 2-1 coastdown shift for example, an energizing signal is sent by control module 10 to the normally vented LR solenoid-actuated valve 46 over bus 38. The LR element prefill begins at 110 and the instantaneous volume of the LR apply element ($V_{LR}$) is thereafter increasing at 300.

The release element (in this instance the 24 shift clutch), turned OFF at the start of the shift at 108, is thereafter controlled at block 52 of FIG. 2 using logic which allows turbine speed to be controlled so as to decrease vulnerability to an increase in throttle. During a coastdown, the turbine speed may approach target gear speed more quickly than desired. In order to avoid this, the turbine speed change is preferably controlled by the release element during apply element prefill such that the prefill is completed, and therefore engagement of the apply element may occur, at a moment when the turbine speed ($N_t$) is slightly above a predefined desired turbine speed ($N_j$) of the gear to be shifted into, i.e., the target gear. The desired turbine speed is determined by control module 10, based on various factors and is preferably stored in the memory of control module 10.

This turbine speed control is accomplished by slowly and selectively venting and applying the release element simultaneously with prefill of the apply element at block 52. To accomplish this, a hold release volume calculation, $V_{hr}$, is used to control release element application while the apply element fills on coastdown shifts to first gear. $V_{hr}$ is set equal to zero at the beginning of the shift and upon occurrence of certain other conditions. These include conditions other than light throttle (generally power or input conditions) when turbine speed is less than or equal to the target gear by a predetermined amount ($N_t \leq N_j - S$) or when turbine speed is more or less than the target speed for the current gear ($N_t \neq N_i$). $V_{hr}$ is also set to zero during light throttle conditions when the time to nearly fill the apply element exceeds the time to vent the release element to zero torque ($t_f > t_v$) or any time turbine speed exceeds that desired for the target gear ($N_t > N_j$). During periods when $V_{hr} = 0$, the normal control logic of the release element is actuated and the instantaneous volume of the release element drops as shown at 302 and 306.

$V_{hr}$ is set equal to $(V)_r$ during conditions when the transmission is operating in a relatively warm or hot operating temperature range upon the first occurrence of either confirmation that the SSV logic sequence is complete or light throttle conditions when the instantaneous tracked volume of the release element is less than its learned fill volume ($V < V_r)_r$ and $t_f > t_v$. However, the limit $V_{hr} \geq (V_f - 0.06)_r$ applies when set equal to $(V)_r$. During this period, the volume of the release element is held constant (at 304) while that of the apply element increases at 300. The release element is thereby controlled from 128 to 130, wherein $V_{hr} = (V)r$, such that it is turned ON when its volume drops below a predetermined value and OFF when it exceeds that limit in order to hold its volume steady. At point 130 returns to zero and the 24 release element is therefore turned OFF.

The $t_v$ variable used in the above equations is the time remaining to vent the release element to a point where it transmits zero torque. This value is updated continuously for release element volume as follows:

| Release Element | $t_v$ (limit $\geq 0$) |
|---|---|
| 24 | .41 $(V - V_f)_r$ |
| OD | .36 $(V - V_f)_r$ | wherein V is the instantaneously tracked volume for that element and $V_f$ the stored filled volume. The 0.41 and 0.36 constants are preferably experimentally determined based on the particular transmission configuration on which this control sequence is to be used.

Apply element prefill continues from 126 after release volume has been held. The LR apply element is turned ON when turbine speed exceeds that of the target speed by a given amount ($N_t > N_j - S$). S is a kickdown start value and:

$$S = \alpha_n \cdot t_f$$

wherein $t_f$ is the remaining time to nearly fill the apply element, as described in detail below, and:

$$\alpha_n = \alpha_{nm} + 18 T_o, \text{ limit } \alpha_{nm} \leq \alpha \alpha_n \leq 3000$$

$$\alpha_{nm} = \alpha_{mnim} = 500$$

The value for $t_f$ is continuously calculated by control module 10 to calculate S. Whenever $N_t$ crosses S (i.e., $N_t > N_j - S$), the apply element is turned ON which reduces S because the apply element is filling. If $N_t$ falls below S (i.e., $N_j - S > N_t$), the apply element is turned OFF. This results in an irregular or variable duty cycle on the apply element shown graphically in FIG. 3 beginning at 126.

An instantaneous rate of acceleration of the turbine, $\alpha_t$, is simultaneously calculated and monitored by control module 10, based upon changes in turbine speed ($N_t$) obtained over signal 16. This gives the transmission control module 10 information regarding just how quickly the shift is taking place. A desired rate of turbine acceleration, $\alpha_t^*$, determined or known by control module 10, is compared with the actual measured or calculated acceleration. The desired acceleration value is preferably determined using positions of the throttle over signal 18 and shift lever over signal 22 and is based upon throttle angle (THR) over signal 18, output speed ($N_o$) over signal 22 and the following relationship:

$$\alpha_t^* = \alpha_{ij} \text{ with } [THR \geq 5° \text{ and } N_o > 400], \text{ otherwise}$$
$$= (N_{j2} - N_t) \div t_f + \alpha_j; \text{ limit } 0 \leq \alpha_t^* \leq \alpha_{ij}$$

wherein $\alpha_{ij}$ are stored table values for desired acceleration for an i to j gear shift, $\alpha_j$ is the target gear acceleration and $N_{j2}$ is target gear speed except having a minimum value of 120.

Referring now to the acceleration curves in the graph of FIG. 3, instantaneous turbine acceleration, $\alpha_t$, is shown in curve 200 against a desired acceleration $\alpha_t^*$ level shown in curve 202. Once the coastdown shift has begun at 204, the transmission control module 10 attempts to maintain $\alpha_t$ close to $\alpha_t^*$. When $\alpha_t$ eventually exceeds $\alpha_t^*$ at 206, the release element (the 24 shift clutch in this exemplary coastdown shift) is reapplied at 122, preferably under a duty cycle, to provide a controlled slope of speed change on the turbine.

The duty cycle is performed by control module 10 which turns the release element alternately ON and OFF at a rate expressible as a percent ON (% ON) time. This duty cycle operation is indicated graphically at 122 as a square wave pattern in the graph of FIG. 3. Preferably, the target volume duty cycle $DC_{tv}$, described in detail in the patents incorporated herein by reference, is used to accomplish this control of the release element. However, other alternate types of duty cycle control could also be employed.

Simultaneously with the turbine speed change, the control module 10 adaptively applies the applying element (low/reverse clutch in the 2-1 shift) based on remaining turbine speed change which has to occur. As turbine speed $N_t$ begins to increase at 500, the control module fills the apply element by comparing the actual turbine speed $N_t$ to the difference between target speed $N_j$ and a kickdown start term S (i.e., apply ON=$N_j$>$N_t$–S). Turbine speed is preferably controlled by the release element so that $N_t$ goes to $N_j$ during $t_f$, having 120 msec of hold-speed to complete the fill of the apply element.

The hold-speed continues until the apply element is filled, begins to develop torque, and pulls $N_t$ back down to the target level $N_j$ at 508. The 24 shift release element is turned OFF at 120 when $N_t$ crosses $N_i$ at 502.

Referring now back to FIG. 2, the prefill of block 52 is preferably controlled such that it ends in a near-apply condition of the apply element. In other words, fluid is applied to the fill cavity of the apply element to a point just before engagement of that element, or to a volume just below the learned apply fill volume for that element, in this case $V_f$(LR). This learned value is preferably stored in battery backed memory of control module 10.

At diamond 54, the controller searches for satisfaction of a condition indicating a near apply condition of the apply element. If this condition is not met, coordinated prefill of the apply element with simultaneous control of the release element in block 52 continue until the near apply condition is met. In the presently preferred embodiment, the nearly filled determination of diamond 54 is made based upon a time remaining to nearly fill calculation. However, alternate indications of a nearly filled apply element could also be used to satisfy this condition.

The time remaining to nearly fill, represented herein as $t_f$ and reaching zero at point 1000 of FIG. 3, is the time required to fast fill the applying element to the level that will provide a desired condition prior to actual application. This value is continuously updated and preferably includes compensation for any duty cycle use during the remaining fill time. This time to nearly fill is calculated as the difference between the current instantaneous apply element volume and the learned fill volume of the element, divided by the fluid flow rate to that element, and may include compensation for line pressure as well as for any reduced fill rate when a duty cycle use is expected:

$$t_f = \frac{(V_f - V)}{M \cdot Q_f} - C_f \cdot K_f$$

wherein:

$C_f$=0.12 with throttle angle≥5°, otherwise =$C_{fm}$–0.003 $T_o$; Limit 0.15≤$C_f$≤$C_{fm}$ wherein $C_{fm}$=Max $C_f$=0.4 and wherein $$K_f = P + (1-P)\frac{Q_v}{M \cdot Q_f}$$

wherein $K_f$ is a duty cycle compensation factor which corrects for the reduced fill rate when duty cycle use is expected and wherein P is the percent ON time of the duty cycle expressed in decimal form, as a fraction of 100. $T_o$ is the transmission oil temperature, preferably predicted by control module 10 using the method described in a copending application of the Assignee of the present invention to H. Benford entitled "Method of Predicting Transmission Oil Temperature", U.S. Ser. No. 08/065,534, filed May 19, 1993, incorporated herein by reference, and wherein:

$$V = V_o + Q\delta t$$

wherein V is the current instantaneous volume of fluid displaced to the apply element, $V_o$ is previous volume and $V_f$ is the learned fill volume of that element, preferably retained in battery backed memory of the control module 10. Q is the element flow rate (typically obtained from a look up table and graph containing empirically determined flow rate characteristics for that element as described in the patent and application incorporated herein) and $\delta t$ equals the time of each loop in the calculation by control module 10, or in other words, the time elapsed since $V_o$ was calculated.

M is a line pressure correction factor. With a coastdown shift, the transmission oil pump will not, under all conditions, have the capacity to maintain the regulated line pressure. Reduced pump output at low engine speed and increased system leakage at elevated oil temperatures are believed to be the primary causes of this condition. Therefore, in calculating a target fluid fill volume for applying an element, in order to accurately predict the moment of application of that element, the resulting low line pressure must be compensated for.

To compensate for low line pressure in the oil pump, a line pressure correction factor M is preferably calculated and updated by control module 10 for each element. This factor is used to correct volume flow calculations to compensate for loss in line pressure that may occur during coastdown shifts. M as used in the above equations typically ranges from a small fraction, just under one half at very high oil temperatures, to unity at relatively low temperatures.

This factor is preferably calculated as a function of predicted transmission oil temperature, indicated herein by $T_o$, and by identifying when the application of the apply element causes an increase in the amount of separation between engine and turbine speeds. M is a ratio of the learned apply element fill volume, as observed under conditions wherein the line pressure is at the regulated level to the apparent larger apply element fill volume as observed under conditions where line pressure is likely to be less than the regulated level. All volume calculations performed in calculating M preferably use look up table stored flow rate values.

In the presently preferred embodiment, the line pressure correction factor M, for purposes of coastdown control, is calculated as follows:

$$M = M_{ij} + (N_o + 750) \div C_p$$

wherein $C_p$ is a pump coefficient, preferably selected using the following table of empirically determined constant values:

| Condition | $M_{ij}$ | $C_p$ |
| --- | --- | --- |
| in 1 or 2-1 or 3-1 | $M_{21}$ | 1800 |
| in 2 or 4-2 or 3-2 | $M_{32}$ | 1750 |

| Condition | $M_{ij}$ | $C_p$ |
|---|---|---|
| All others | $M_{43}$ | 1700 | wherein the "condition" indicates whether the transmission is in first gear (in 1), second gear or in the process of a downshift. $N_e$ is the engine speed obtained over signal 14 and the 750 term represents a speed correction constant representing a nominal or normal engine idle speed in rotations per minute (rpm).

$M_{ij}$ is a value based on predicted or calculated oil temperature, $T_o$, wherein "i" represents the current gear and "j" the gear to be shifted into. Appropriate $M_{ij}$ correction factors are learned for the temperature range in use during the i to j coastdown shift as shown in the table and accompanying graph of FIG. 4. Calculation of $M_{ij}$ begins with an initial value extracted from the appropriate entry in the table of FIG. 4.

Shown in the graph of FIG. 4, breakpoints A, B, C, D and E represent an average of nominal values empirically obtained as a function of transmission oil temperature $T_o$. The first and last breakpoints, indicated as A and E, are fixed and not learned and zero slope exists outside of these breakpoints. The intermediate $M_{ij}$ breakpoint values B, C and D are learned or adjusted when specified conditions are met and are preferably stored in battery backed memory of transmission control module 10. During any battery disconnect, these RAM stored values are preferably reinitialized with initial values stored in ROM memory of control module 10.

The breakpoints are preferably adjusted, however, only under certain circumstances. First, they can be adjusted with changes in $V_f$, or the learned fill volume of a particular element. These values may be adjusted for changing element fill volumes as follows:

$$M_{ij} = M_{ij}(i-1) \frac{(V_f(i-1) + \delta V_f)}{V_f(i-1)}$$

wherein $M_{ij}$ is the previous value of $M_{ij}$ and $V_f$ (i–1) is the previous value of $V_f$.

In the present exemplary transmission for a change in the two/four shift element fill volume, $M_{32}$ is adjusted. For a change in the underdrive element fill volume, $M_{43}$ is adjusted. For a change in the fill volume of the low/reverse clutch, $M_{21}$ is adjusted, but preferably only when the change in volume is positive or the volume change is negative and $M_{ij}$ (i–1)>0.9. However, it should be apparent that these changes may vary depending upon the type of transmission and the relationship between its friction elements and resulting gears.

Under certain other conditions, these breakpoints are preferably adjusted as follows, wherein $M_L$ is the lower $M_{ij}$ breakpoint and $M_H$ the higher breakpoint relative to calculated transmission oil temperature $T_o$:

with $\delta M>0$, then $M_L=M_L(i-1)+\delta M_L$ $M_H=M_H(i-1)+\delta M_H$ wherein $M_L(i-1)$ and $M_H(i-1)$ are the previous values for the low and high breakpoints, respectively, and wherein:

$\delta M = \delta V_f M_{avg} \div (\delta V_f + V_f)$ wherein $M_{avg}$ is the average value of M during apply fill of an element on coastdowns and wherein:

$\delta M_H = 0$ with $T_H =$ last breakpoint, otherwise
$\quad = 0.016 \ (T_o - T_L) \div (T_H - T_L)$
$\delta M_L = 0$ with $T_L = T_A$, otherwise
$\quad = 0.016 \ [1 - (T_o - T_L) \div (T_H - T_L)]$
$T_L =$ Temperature breakpoint $< T_o$
$T_H =$ Temperature breakpoint $\geq T_o$ Those circumstances necessitating a change in this manner preferably include: the instantaneous fluid volume of the apply element being zero at the beginning of a shift with the throttle angle also less than 5°; the shift lever position of signal 20 being in an overdrive position in a 4-3 or 3-2 downshift; the engine speed $N_e$ over signal 14 being less than that at $M_{max}$ and the output speed $N_o$ over signal 22 being less than 400 rpm during a 2-1 or 3-1 downshift; during engine braking conditions when the turbine speed is equal to the desired turbine speed for the present gear ($N_t=N_i$) at the start of the shift and the engine speed exceeding a predefined desired amount (at least 40 rpm) less than the turbine speed ($N_e<N_t+40$) until the turbine speed exceeds that of the present gear ($N_t>N_i$); or during other than engine braking conditions when the engine speed exceeds the turbine speed ($N_e>N_t$) until an acceleration feedback duty cycle such as $DC_{\alpha 2}$ is commenced.

The calculation of M provides compensation for variations in line pressure and thereby enables the accurate calculation of the fluid volume necessary to engage the apply element. Therefore in conjunction with fluid flow rates, M also enables calculation of the time remaining to nearly fill that element. When the time to nearly fill the apply clutch, $t_f$, equals zero, application of the apply element is imminent and, absent any changes in vehicle operating conditions, the release element is "dumped" or completely vented at block 56 of FIG. 2. To accomplish this, the release element is turned logically OFF at 120 by the transmission controller by an appropriate signal to the corresponding solenoid-actuated valve. In the exemplary 2-1 shift, control module 10 sends an energizing signal on bus 36 to valve 44 to effect release of the normally applied 24 shift element. The OFF-going element is preferably released quickly to avoid excessive engine braking torque.

The apply element is then softly applied at 124, as required in block 58, preferably using an appropriate duty cycle such as soft-apply duty cycle $DC_s$ described in detail below, using the correction factor M as calculated above. The apply point of the apply element is then checked in diamond 60 and if the apply point has not been reached, the soft apply duty cycle of block 58 continues.

The soft apply duty cycle has a period of 21 msec, ON synchronous with $t_f=0$ and THR<5°.

% ON=$A \ (B-M)+\delta$ wherein

A and B are constants determined independently for each element based on factors such as maintaining predetermined fill rate independent of line pressure (or M) and wherein $\delta \ = 0$ with $(V \leq V_f)_a$, otherwise
$\quad = \delta(i-1) + 0.8\%$ with $\alpha_{tf} \geq 0$, otherwise
$\quad = \delta(i-1)$ The apply point of the apply element is indicated to control module 10 at 506 by the identification of a minimum speed difference ($S_m$) between the engine speed ($N_e$) and turbine speed ($N_t$) wherein $S_m=N_e-N_t$ at the point this difference is at a minimum. In the presently preferred embodiment, the apply point of an element is identified at 506 in FIG. 3. To identify the point of minimum speed difference, $S_m$, control module 10 preferably monitors and compares engine speed over signal 14 and turbine speed 16.

When the apply point of the apply element is identified, ideally $C_f$ seconds after $t_f$=0, the fill volume of the apply element (in this instance $V_f(LR)$) can be learned and updated if certain conditions are met. In a 2-1 coastdown shift, the fill volume of the low/reverse element $V_f$ (LR) is adjusted only upon occurrence of a number of conditions, each requiring an adequate engine speed $N_e$. The first instance $V_f$ (LR) is adjusted is if engine speed exceeds turbine speed ($N_e>N_t$), the throttle angle is less than 5° (THR<5°), the time to nearly fill has not been reached ($t_f>0$) and the turbine speed has exceeded the second gear target speed ($N_t>N_j$) for at least a predetermined amount of time, preferably 14 msec. $V_f$ (LR) is also adjusted if the turbine speed exceeds that of the target turbine speed ($N_t>N_j$) for second gear by more than a predetermined amount (preferably 50 rpm) and if an apply element hold speed duty cycle is not applied and if the difference between engine speed and turbine speed is more than 5 rpm less than a minimum speed difference, $S_m$, wherein:

$$S_m = S \text{ with } t_f > 0 \text{ or } S < S_m(i-1), \text{ otherwise}$$
$$= S_m(i-1) + 2 \text{ with } S(i) \leq S(i-1), \text{ otherwise}$$
$$= S_m(i-1)$$

wherein S is instantaneous difference between $N_e$ and $N_t$.

If the above conditions are met, the learned fill volume is set by control module 10 to the instantaneous volume of that element, in this case $V_f$ (LR) =$V_{LR}$, wherein this instantaneous fill volume has been calculated by control module 10 as follows:

$$V=V_o+Q\delta t$$

as discussed above in conjunction with the calculation of $t_f$. The newly calculated learned volume is then stored in memory of the control module 10 and this change in the learned fill volume for an element also then triggers an update of $M_{ij}$ as discussed above, in this case an adjustment of $M_{21}$.

However, to prevent incorrectly learning excessively low $M_{21}$ values when a large low/reverse element fill volume exists, the volume is incremented up when at moderate temperatures:

SET $(V_f=V_f+0.03)_{LR}$ with [$\delta M<-0.02$ & $M_{ij}<0.7$ & $T_o<160°$]

Once the apply point of the apply element has been reached when turbine speed equals that of the target gear at 508, thereby satisfying the condition of diamond 60, block 62 thereafter initiates an acceleration-feedback duty cycle, preferably $DC_{\alpha 2}$, as disclosed in the referenced patents, having the objective of holding the apply status of the apply element to complete the engagement and to bring the turbine speed ($N_t$) down to a targeted level ($N_j$) at 508. However, the percent ON calculation differs from that used in the referenced patents as follows:

Period = 14 msec w(2-1 or 3-1) and
  THR < 5° and $T_o$ > 70° F.,
  otherwise = 21 msec.
Initial % ON = 100(Q − $Q_r$) ÷ (M$Q_a$ − $Q_r$) with
  THR < 5°, otherwise
  = 50% for UD, 52% for 24, 45% for LR For THR<5%, Q=0, $Q_a$ and $Q_r$ are the instantaneous apply or release flow rates for the apply element without duty cycle operation.

To further improve this coastdown shift control strategy, the control module 10 also searches for indication of what is commonly called a "coastdown tip-in" condition. This condition generally occurs during a coastdown shift when a slight increase in throttle indicates a possible acceleration, and therefore an accompanying soon to follow increase in input torque. The tip-in condition is recognized by control module 10 by monitoring the throttle angle over signal 18 for a closed throttle downshift condition.

Referring now to FIG. 5, the search for a tip-in condition is run as a background routine by control module 10 and begins at bubble 70 with a possible coastdown condition. At diamond 72, the shift lever position indicated by PRNODDL signal 22 must indicate that the shift lever position is currently in overdrive. At diamond 74, the throttle angle, monitored over signal 18, must also be less than a predefined number of degrees, 3° in the presently preferred embodiment, and must have been at or below this level through the previous few cycles of the control program (diamond 76). If the conditions of all of diamonds 72, 74 and 76 have been met, a low throttle flag is set at block 78 and the routine advances to diamond 80.

If the low throttle flag has been set, a tip-in condition is recognized at diamond 80 if also the throttle angle has increased above that necessary to set the low throttle flag (3°), and if it has been increasing over the previous several processor loops of control module 10, or else if the throttle angle is significantly large, in the present transmission preferably greater than 5°.

Upon the recognition of a tip-in condition by control module 10, the control module 10 begins a more aggressive application of fluid to the apply element at block 82 in order to be able to handle the approaching input torque increase. This is illustrated best with reference to the accompanying graph of FIG. 6. As shown at reference numeral 600, the apply element is immediately filled at full force to its learned fill volume $V_f$, where it remains until turbine speed equals or exceeds that of the target gear. This is in contrast to the soft apply fill process illustrated in the curve 602.

The present invention therefore provides significant improvements over previous transmissions of this type. Accurate calculation of a line pressure correction factor and prediction of application of the apply element allow greater shift quality. Prediction of a tip-in coastdown condition further improves transmission responsiveness and performance.

The foregoing discussion discloses and describes merely exemplary embodiments of the present invention. One skilled in the art will readily recognize from such discussion, and from the accompanying drawings and claims, that various changes and modifications can be made therein without departing from the spirit and scope of the invention as defined in the following claims.

What is claimed is:

1. In an electronic controller for an electronically controlled vehicle automatic transmission system wherein the vehicle includes sensors for providing signals indicative of vehicle operating conditions, the transmission system includes a plurality of solenoid-actuated valves being movable and having logical operating states (ON and OFF) responsive to an electrical signal to control flow of a fluid to cause application or release of a friction element and wherein said electronic controller includes means for receiving input signals from said sensors indicative of predetermined vehicle conditions, memory means for storing information, processor means for performing calculations and generating output signals, and means for applying said output signals to said solenoid-actuated valves, a method of controlling a coastdown shift comprising the steps of:

prefilling an apply friction element so as to partially fill the apply friction element by selectively turning ON an apply element valve;

calculating a time remaining to nearly fill the apply friction element to cause engagement of the apply friction element;

monitoring a signal indicative of speed of a turbine of a torque converter of the vehicle; and turning OFF a release friction element valve to release a release friction element when turbine speed reaches a target gear speed and once the time to nearly fill the apply element equals a predetermined value.

2. The method of claim 1 wherein said predetermined value is zero.

3. The method of claim 1 further comprising the steps of:

monitoring a signal indicative of vehicle engine speed;

comparing said engine speed to said turbine speed;

monitoring an instantaneous fluid volume of the apply friction element; and adjusting a learned fill volume value for the apply element stored in said electronic controller memory based upon the instantaneous fluid volume of said apply element at a point in the coastdown shift when the difference between the engine speed and turbine speed is at a minimum.

4. The method of claim 3 further comprising the step of calculating a line pressure correction factor using said learned volume fill value.

5. The method of claim 1 further comprising the steps of:

monitoring a signal indicative of the rotational speed of a turbine of a torque converter of the vehicle;

calculating a present rate of turbine acceleration;

determining a desired rate of turbine acceleration; and selectively applying the release element during said prefill of the apply element when said present rate of acceleration exceeds said desired rate of acceleration.

6. The method of claim 5 wherein a duty cycle is used to alternately cycle the release element ON and OFF during said selective application.

7. The method of claim 1 further comprising the step of completing prefilling of the apply element so as to engage the apply element after release of the release element.

8. The method of claim 7 wherein a duty cycle is used to selectively cycle the apply element ON and OFF during said completing application of the apply element.

9. The method of claim 1 further comprising the steps of:

monitoring a signal indicative of temperature of transmission oil; and calculating a line pressure correction factor as a function of said transmission oil temperature.

10. The method of claim 9 wherein said correction factor is used in determining said time to nearly fill.

11. The method of claim 10 wherein said correction factor is a ratio of a learned apply element fill volume when at a regulated line pressure level to an apparent larger apply element fill volume when line pressure is likely to be less than the regulated level.

12. The method of claim 3 further comprising the step of controlling said speed of said turbine by selectively venting and applying the release element simultaneously with said prefill of the apply element.

13. The method of claim 3 wherein said apply element is turned ON whenever said turbine speed exceeds a kickdown start target speed by a predetermined amount.

14. The method of claim 1 wherein said time to nearly fill is calculated as the difference between a current instantaneous apply element volume and a learned fill volume of the apply element, divided by fluid flow rate to that element.

15. In an electronic controller for an electronically controlled vehicle automatic transmission system wherein the vehicle includes sensors for providing signals indicative of vehicle operating conditions, the transmission system includes a plurality of solenoid-actuated valves responsive to an electrical signal to control flow of a fluid to cause application or release of a friction element and wherein said electronic controller includes means for receiving input signals from said sensors indicative of predetermined vehicle conditions, memory means for storing information, processor means for generating output signals and means for applying said output signals to said solenoid-actuated valves, a method of controlling a coastdown shift comprising the steps of:

prefilling an apply friction element so as to partially fill the apply friction element;

identifying an oncoming increase in input torque indicative of a possible oncoming acceleration;

prefilling said apply friction element at an increased fluid fill rate upon the identification of said oncoming increase in input torque;

monitoring a signal indicative of speed of a turbine of a torque converter in a vehicle: and controlling a release friction element so as to control turbine speed and to release the friction element when turbine speed achieves a target gear speed and volume of the apply element exceeds prefill volume by a predetermined amount.

16. The method of claim 15 wherein said oncoming increase in input torque is identified by said transmission controller by monitoring a signal indicative of throttle angle and identifying said oncoming torque increase when said throttle angle has been steadily below a predetermined value and then rises above said value.

17. The method of claim 16 wherein said predefined throttle angle value is 3°.

18. In an electronic controller for an electronically controlled vehicle automatic transmission system wherein the vehicle includes sensors for providing signals indicative of vehicle operating conditions, the transmission system includes a plurality of solenoid-actuated valves responsive to an electrical signal to control flow of a fluid to cause application or release of a vehicle transmission friction element and wherein said electronic controller includes means for receiving input signals from said sensors indicative of predetermined vehicle conditions, memory means for storing information, processor means for generating output signals and means for applying said output signals to said solenoid-actuated valves, a method of controlling a coastdown shift comprising the steps of:

prefilling an apply friction element so as to partially fill the apply friction element;

calculating a time remaining to nearly fill the apply friction element so as to cause engagement of the apply friction element;

monitoring a signal indicative of speed of a turbine of a torque converter of the vehicle;

monitoring a signal indicative of vehicle engine speed;

comparing the engine speed to said turbine speed;

monitoring an instantaneous fluid volume of the apply friction element;

adjusting a learned fill volume for the apply element stored in said electronic controller memory based upon the instantaneous fluid volume of the apply element at a point in the coastdown shift when the difference between engine speed and turbine speed is substantially near a minimum; and releasing a release friction element once the time to nearly fill the apply element equals a predetermined value.

19. The method of claim 18 further comprising the steps of:

searching for indication of a tip-in condition; and upon recognition of a tip-in condition, turning said apply element ON.

20. The method of claim 19 wherein said tip-in condition is indicated if a vehicle shift lever is in an overdrive position.

21. The method of claim 20 wherein said tip-in condition is indicated if a throttle angle is less than a predetermined number of degrees.

22. The method of claim 21 wherein said predetermined number of degrees is 3°.

23. The method of claim 22 wherein said throttle angle must have been at or below said predetermined number of degrees for a predefined time period.

24. The method of claim 23 wherein said tip-in condition is recognized if said throttle angle has increased above said predefined number of degrees and has been increasing for a predefined time period or if the throttle angle exceeds a predefined angle.

25. The method of claim 24 wherein said predefined throttle angle is 5°.

26. The method of claim 25 wherein said apply element is turned ON until time remaining to fill is zero.

* * * * *